United States Patent
Iwase et al.

(10) Patent No.: US 7,722,395 B2
(45) Date of Patent: May 25, 2010

(54) WIRE, DETECTOR HAVING WIRE, AND DIE FOR WIRE

(75) Inventors: Eiichiro Iwase, Toyoake (JP); Mitsuaki Hibino, Chiryu (JP)

(73) Assignee: Aisin Seiki Kabushiki Kaisha, Aichi-ken (JP)

( * ) Notice: Subject to any disclaimer, the term of this patent is extended or adjusted under 35 U.S.C. 154(b) by 154 days.

(21) Appl. No.: 11/792,287

(22) PCT Filed: Jan. 11, 2006

(86) PCT No.: PCT/JP2006/300179
§ 371 (c)(1),
(2), (4) Date: Jun. 5, 2007

(87) PCT Pub. No.: WO2006/075593
PCT Pub. Date: Jul. 20, 2006

(65) Prior Publication Data
US 2008/0132104 A1      Jun. 5, 2008

(30) Foreign Application Priority Data
Jan. 14, 2005    (JP) .............................. 2005-007756

(51) Int. Cl.
*H01R 13/40* (2006.01)
(52) U.S. Cl. ................. 439/587; 439/274; 439/588
(58) Field of Classification Search ................. 439/587, 439/588, 274, 275, 279, 272; 174/564
See application file for complete search history.

(56) References Cited
U.S. PATENT DOCUMENTS 2,563,829 A * 8/1951 Fitzgerald et al. ......... 174/23 R
6,064,002 A    5/2000  Hayami et al.
6,465,737 B1   10/2002 Bonato et al.
6,485,325 B1 * 11/2002 Fukuda ....................... 439/465
2005/0020130 A1 * 1/2005 Cavanaugh ................. 439/587

FOREIGN PATENT DOCUMENTS

FR         2 783 082          9/1998

(Continued)

OTHER PUBLICATIONS

International Search Report of PCT/JP2006/300179 mailed Feb. 21, 2006.

(Continued)

*Primary Examiner*—Tho D Ta
(74) *Attorney, Agent, or Firm*—Stites & Harbison, PLLC; Juan Carlos A. Marquez, Esq (57) ABSTRACT

A rotation sensor 11 includes a sensor portion 12, a wire 13 connected to the sensor portion 12, and a resin housing 14. The wire 13 has a sheath 24 formed of a resin compatible with the resin forming the housing 14. The portion of the sheath 24 covered by the housing 14 includes two annular sealing projections 25 extending along the entire circumference of the sheath 24. When molten resin is poured into a housing formation mold to mold the housing 14, the heat of the molten resin is efficiently transferred to the sealing projections 25. This effectively melts the sealing projections 25 and ensures that the sealing projections 25 are fused with the housing 14.

11 Claims, 4 Drawing Sheets

FOREIGN PATENT DOCUMENTS

| | | |
|---|---|---|
| JP | 57-130534 | 8/1982 |
| JP | 61-85028 | 11/1984 |
| JP | 61-085028 | 11/1984 |
| JP | 4-71216 | 11/1990 |
| JP | 09-045399 | 7/1995 |
| JP | 10-058480 | 8/1996 |
| JP | 10-115629 | 10/1996 |
| JP | 2003-217361 | 9/1997 |
| JP | 200-019185 | 6/1998 |
| JP | 2000-019185 | 6/1998 |
| JP | 2003-117955 | 10/2001 |

OTHER PUBLICATIONS

PCT International Preliminary Report on Patentability for PCT/JP2006/300179, dated Jul. 26, 2007, in English.
Extended European Search Report mailed Aug. 25, 2009.
Office Action from Japanese Patent Office dated Jan. 19, 2010.

* cited by examiner

WIRE, DETECTOR HAVING WIRE, AND DIE FOR WIRE

TECHNICAL FIELD OF THE INVENTION

The present invention relates to a wire used for signal transmission, a detector incorporating the wire, and a mold used to thermally compress the wire.

BACKGROUND ART OF THE INVENTION

In the prior art, a rotation sensor is used to detect the rotational speed of a vehicle wheel or power transmission shaft. The rotation sensor has a sensor portion, a wire for transmitting electrical signals output from the sensor portion, and a resin housing covering the sensor portion and the wire. The wire, which is connected to the sensor portion inside the housing, extends outward from the housing. The rotation sensor is normally used under severe conditions and is thus required to have a high water resistant property. Patent document 1 and patent document 2 both disclose a sealing structure for preventing water leakage through the interface between the housing and the wire.

In patent document 1, a wire (more specifically, the sheath covering a conductive line) and a housing are made of the same material. When molding the housing, the housing and the wire are fused to each other to improve the sealing. More specifically, the housing is formed by pouring a molten resin material into a housing formation mold in a state in which the sensor portion and an end of the wire is arranged in the mold. The heat from the molten resin material poured into the mold fuses the resin material with the wire.

The mold includes a gate for injection of the molten resin material into the mold. However, depending on the shape of the molded housing, the injection gate is distant from the wire, which is arranged in the mold. In this case, the temperature of the molten resin material injected into the mold through the gate may decrease before the molten resin material reaches the wire. Thus, the surface temperature of the wire may not rise sufficiently. This would lower the adhesive strength between the wire and the resin material of the housing and cause the sealing at the interface between the housing and the wire to be insufficient.

In patent document 2, a housing formation mold includes a constricting portion, which is located where the wire is arranged. The constricting portion is formed by reducing the diameter of an inner wall surface of the mold at the location where the wire is arranged. The distance between the wire and the inner wall surface of the mold is reduced by the constricting portion. When filling the mold with a molten resin material, the constricting portion presses the molten resin material against the wire. This efficiently transfers the heat of the molten resin material to the wire and fuses the wire to the resin material of the housing in an optimal manner.

However, in patent document 2, the constricting portion must be formed at the location where the wire is arranged. This limits the shape of the housing. That is, the constricting portion must be taken into consideration when determining the shape of the housing. This makes it difficult to reduce the size of the housing and to shape the housing in accordance with the location at which the rotation sensor is installed.

Patent Document 1: Japanese Laid-Open Patent Publication No. 10-115629

Patent Document 2: Japanese Laid-Open Patent Publication NO. 2000-19185

DISCLOSURE SUMMARY OF THE INVENTION

It is an object of the present invention to improve the degree of freedom for the shape of the housing covering the wire and to ensure the sealing at the interface between the wire and the housing.

To achieve the above object, the present invention provides a wire, including a conductive line for transmitting an electrical signal and a sheath covering the conductive line, connected to a sensor portion accommodated in a housing. The sheath is formed of a resin compatible with a material forming the housing. A sealing projection is arranged on a portion of the sheath that contacts the housing so as to extend over the entire circumference of the sheath in the circumferential direction.

In the present invention, the sealing projection extending over the entire circumference of the sheath in the circumferential direction increases the surface area of the sheath. When molten material is poured into a housing formation mold for molding the housing, the heat of the molten material is efficiently transferred to the sealing projection. Therefore, even if the temperature of the molten material is relatively low, the sealing projection is effectively melted or softened. This ensures that the housing and the sealing projection are fused with each other. Further, a structure for improving the sealing performance is provided on the wire itself. Thus, the structure does not affect the shape of the housing.

Preferably, the sealing projection is arranged in a plurality in the axial direction of the wire. This further improves the sealing performance in comparison with when there is only one sealing projection.

In one aspect of the present invention, the sheath includes annular grooves spaced by a predetermined interval in the axial direction of the wire. The sealing projection is formed by a portion of the sheath between two adjacent grooves, and the grooves are formed by compressively deforming the sheath inward in the radial direction.

In the present invention, the sheath includes an intersecting wall intersecting the sealing projection. The sealing projection and the intersecting wall support each other. When the housing is molded, this prevents ridges and valleys from being substantially eliminated from the sealing structure and prevents the sealing projection and the intersecting wall from collapsing. Accordingly, when the housing is molded, the sealing projection is melted or softened, and the fusing of the housing and the sealing projection is ensured.

A circumferential portion corresponding to the intersecting wall may have a height that is the same as the intersecting wall in the radial direction of the wire. This would have the sealing projection and the intersecting wall supporting each other in an optimal manner so that they do not collapse.

The intersecting wall may project further outward in the radial direction of the wire than the sheath.

The intersecting wall may have a thickness that increases inward in the radial direction of the wire. This would further ensure that the intersecting wall does not collapse.

In one aspect of the present invention, the sheath includes portions around the sealing projection and the intersecting wall that are compressively deformed inward in the radial direction by a mold. Portions of the sheath surrounded by the compressively deformed portions form the sealing projection and the intersecting wall.

Preferably, excess material obtained when compressively deforming the sheath forms the thin wall. This prevents burrs from being formed by the excess material.

The present invention further provides a detector including the above wire. The detector includes a sensor portion, a wire connected to the sensor portion to transmit an electrical signal output by the sensor portion, and a housing formed from resin and covering the sensor portion and an end of the wire that is connected to the sensor portion.

The present invention further provides a mold for thermally compressing a wire including a conductive line for transmitting an electrical signal and a sheath for covering the conductive line. The mold is divided into two symmetric mold members. The two mold members have mating surfaces facing each other. Each of the mating surfaces is formed by a recess having a semi-circular cross-section. The recess is formed by a surface that defines a molding surface for compressing the sheath. Each of the molding surfaces includes at least two semi-circular pressing portions extending in the circumferential direction of the molding surface and a semi-circular groove extending between the two pressing portions in the circumferential direction of the molding surface. The pressing portions have a radius that is smaller than that of the wire. Each of the mating surfaces includes a recess continuous with the two ends of the molding surface in the circumferential direction. The recesses form a relief space continuous with a molding space formed by the two molding surfaces when the mating surfaces of the mold members abut against each other.

Each of the mold members may have a relief pit continuous with the two ends of the groove in the circumferential direction and continuous with the recess.

BEST MODE FOR CARRYING OUT DETAILED
DESCRIPTION OF THE PREFERRED
EMBODIMENTS INVENTION

One embodiment of the present invention will be described with reference to FIGS. 1 to 10. In this embodiment, the present invention is embodied in a rotation sensor 11 for detecting the rotational speed of a wheel.

Figure 1:
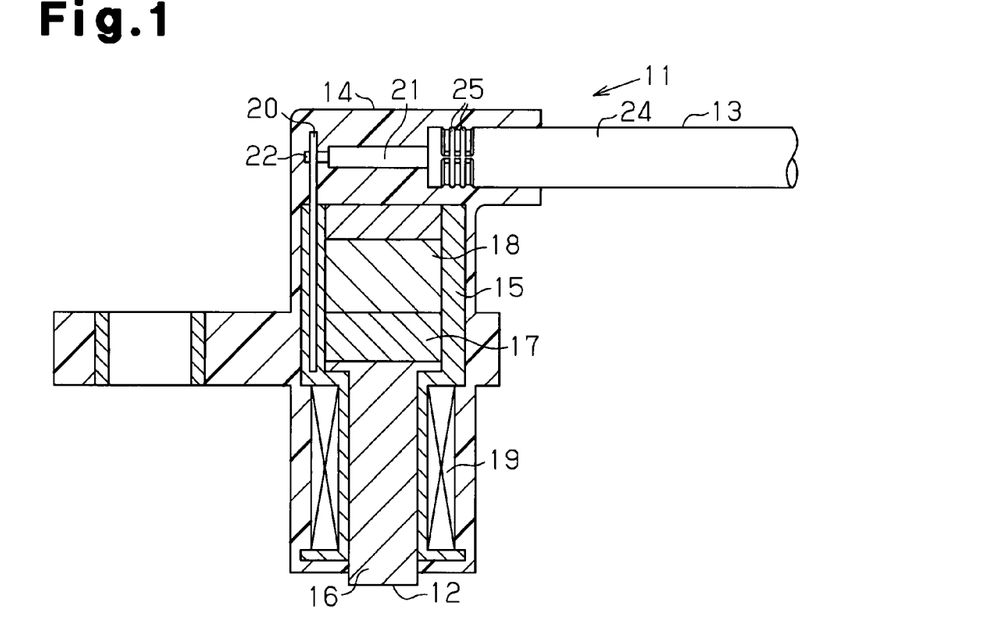
FIG. 1 is a cross-sectional view of a rotation sensor according to an embodiment of the present invention.

FIG. 1 is a side cross-sectional view schematically showing the rotation sensor 11, which serves as a detector. The rotation sensor 11, which is of an electromagnetic pickup system, is arranged to face a rotor (not shown), which is arranged separately in a vehicle. The rotation sensor 11 includes a sensor portion 12, a wire 13 connected to the sensor portion 12, and a housing 14 covering the sensor portion 12 and the wire 13 (more specifically, the portion including the end of the wire connected to the sensor portion 12).

The sensor portion 12 has a hollow cylindrical bobbin 15 formed of a resin material. A yoke 16, a magnet 17, and a back core 18 are arranged in the bobbin 15. The yoke 16, the magnet 17, and the back core 18 are made of a magnetic material and form a magnetic circuit. A coil 19 is wound around the bobbin 15. The two ends of a conductive line that forms the coil 19 are connected to the wire 13 by two terminals 20 (only one shown) provided in the bobbin 15.

The sensor portion 12 detects changes in a magnetic field with the yoke 16 when the rotor rotates with the wheel and coverts the detected change into an electrical signal with the coil 19. The coil 19 generates induction current as an electrical signal in accordance with the change in the magnetic field. The sensor portion 12 externally transmits the electrical signal via the terminals 20 and the wire 13.

Figure 4:
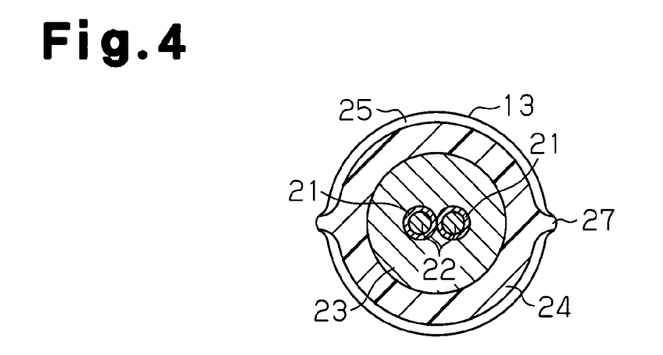
FIG. 4 is a cross-sectional view taken along line 4-4 in FIG. 2.

As shown in FIG. 4, the wire 13 includes two conductive lines 22, an inner layer 23, and a sheath 24. The conductive lines 22 are each covered by an insulation film 21 and embedded in the inner layer 23. The sheath 24 covers the inner layer 23. As shown in FIG. 1, the sheath 24 and the inner layer 23 are removed at the end of the wire 13 to expose the conductive lines 22, which are covered by the insulation film 21. The exposed conductive lines 22 are electrically connected to the corresponding terminals 20, respectively. The wire 13 of this embodiment is a round wire having a circular cross-sectional shape.

The sensor portion 12 and the wire 13 (more particularly, the portion including the end of the wire 13 connected to the sensor portion 12) are embedded in the resin housing 14 when the housing 14 is molded. This integrates the sensor portion 12 and the wire 13 with the housing 14. A polyamide (nylon resin) which is advantageous in terms of ductility or the like is used as the material of the housing 14. The sheath 24 is made of a material having high compatibility with the material of the housing 14. A material having high compatibility refers to a material having a high compatibility index, a material having a satisfactory wetting property, or material that facilitates adhesion. In this embodiment, a polyamide (nylon resin) is used as the material of the sheath 24.

The wire 13 of this embodiment has a sealing structure for sealing the interface between the wire 13 and the housing 14. The sealing structure will now be described in detail.

Figure 2:
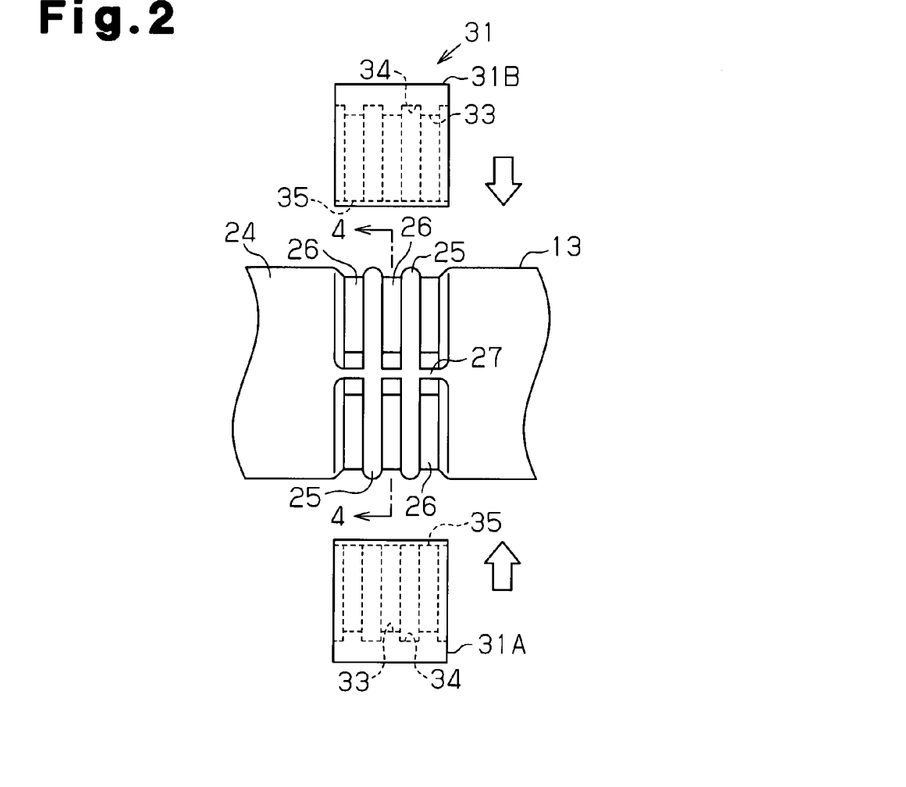
FIG. 2 is a partially enlarged side view of a wire in the rotation sensor of FIG. 1.

As shown in FIG. 2, a plurality of (two in this embodiment) annular sealing projections 25 extending around the entire circumference of the sheath 24 are formed at an end of the sheath 24 of the wire 13 (i.e., the portion of the sheath 24 embedded in the housing 14). The sealing projections 25 are obtained by forming a plurality of (three in this embodiment) annular grooves 26 in the sheath 24. Accordingly, the sealing structure is formed on the sheath 24 by alternately arranging the three grooves 26 and the two sealing projections 25 in the axial direction of the wire 13. The sealing projections 25 have the same height as the sheath 24 in the radial direction of the wire 13. In other words, the sealing projections 25 have the same outer diameter as the other parts of the sheath 24.

The sealing projections 25 ensure the sealing at the interface between the housing 14 and the wire 13 when the housing 14 is molded to cover the end of the wire 13. More specifically, the housing 14 is molded by pouring a molten resin material into a housing formation mold (not shown) in a state in which the sensor portion 12 and the end of the wire 13 are arranged in the mold. The heat of the molten resin material poured into the mold melts the sheath 24 of the wire 13 so as to fuse the sheath 24 with the resin material (i.e., the housing 14). During this process, the sealing projections 25 of the sheath 24 increase the area of the sheath 24 that contacts the molten resin material. This efficiently increases the temperature of the sheath 24. Therefore, even if the temperature of the molten resin material is relatively low, the sheath 24 (more particularly, the sealing projections 25) is melted or softened in an optimal manner, and the housing 14 and the sheath 24 (sealing projections 25) are fused to each other in an ensured manner. The sealing projections 25 are formed to extend entirely around the entire circumference of the wire 13. This ensures that the entire circumference of the wire 13 is fused to the housing 14 and ensures the sealing of the interface between the housing 14 and the wire 13.

Figure 3:
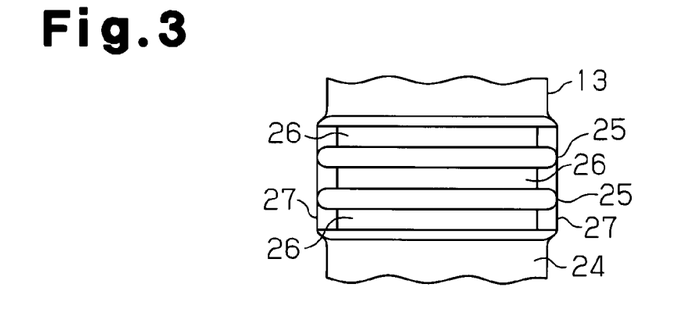
FIG. 3 is a plan view of the wire of FIG. 2.

As shown in FIGS. 2 to 4, two thin walls 27 having a predetermined thickness are formed on the sheath 24 of the wire 13 so as to intersect the sealing projections 25. The thin walls 27 extend in the axial direction of the wire 13 (lateral direction of FIG. 2). In other words, the thin walls 27 extend orthogonally to the sealing projections 25. As shown in FIGS. 3 and 4, the two thin walls 27 are arranged at an angular interval of 180 degrees. Further, the thin walls 27 slightly project outward from the sheath 24 in the radial direction of the wire 13. The thickness of the thin walls 27 is such that the thin walls 27 are slightly melted by heat but do not collapse. More specifically, the thickness of the thin walls 27 is determined based on the properties of the resin material forming the sheath 24, the height of the thin walls 27 (the height of the thin walls 27 in the radial direction of the wire 13), and so on. The thin walls 27, which serve as intersecting walls that intersect the sealing projections 25, function as support walls for supporting the sealing projections 25 so that the sealing projections 25 do not collapse.

As shown in FIGS. 3 and 4, the circumferential portions of the sealing projections 25 corresponding to the thin walls 27 have the same height as the thin walls 27 in the radial direction of the wire 13. Thus, the portions of the sealing projections 25 corresponding to the thin walls 27 bulge more outward in the radial direction than the other portions. Further, the thickness of the thin walls 27 increases towards the radially inner side of the wire 13, that is, toward the basal portions of the thin walls 27. Consequently, the thin walls 27 do not collapse easily. The thin walls 27 are formed by the material that becomes excessive when forming the grooves 26 in the sheath 24.

The intersecting sealing projections 25 and thin walls 27 support one another and thus do not easily collapse even when melted by heat. This prevents the ridges and valleys in the sealing structure of the sheath 24 from being substantially eliminated by the collapsing of the sealing projections 25 or the thin walls 27 during the molding of the housing 14. Accordingly, in the present embodiment in which the sealing projections 25 and the thin walls 27 do not easily collapse, the sealing at the interface between the housing 14 and the wire 13 is ensured.

The sealing structure is formed by thermally compressing the sheath 24 of the wire 13 with a mold 31 shown in FIG. 2 and FIGS. 5 to 8. The process for forming the sealing structure will now be discussed.

First, the mold 31 used to thermally compress the sheath 24 will be described. As shown in FIG. 2, the mold 31 is divided into two symmetric mold members 31A and 31B. The mold members 31A and 31B have mating surfaces 32 facing toward each other. As shown in FIGS. 5 to 8, a recess having a semi-circular cross-sectional shape is formed in each of the mating surfaces 32. The surface with the recess includes a molding surface 30 shaped in correspondence with the sealing structure so as to compression mold the sealing structure.

Figure 5:
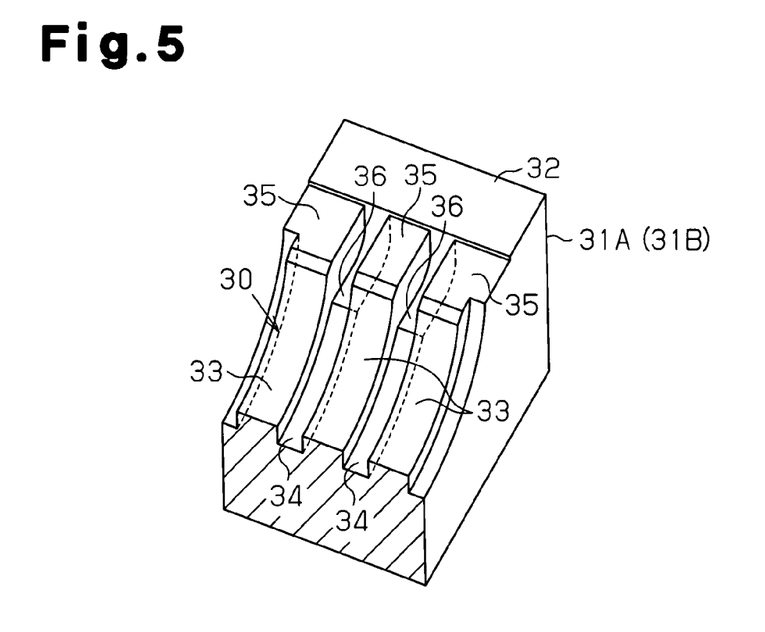
FIG. 5 is a partial cutaway view of a mold.
Figure 6:
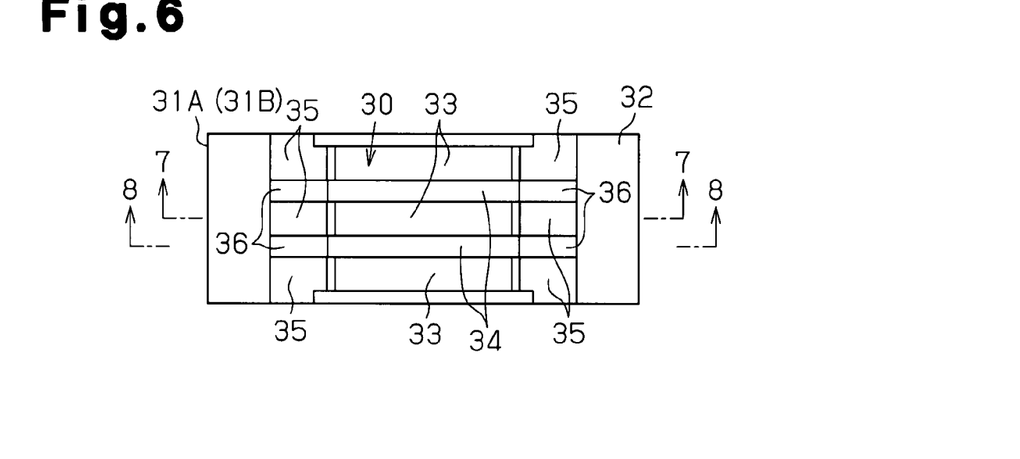
FIG. 6 is a plan view of the mold of FIG. 5.

The molding surface 30 includes three compressing projections (pressing portions) 33 corresponding to the grooves 26 and two grooves 34 corresponding to the sealing projections 25. The compressing projections 33 and the grooves 34 are arranged alternately along the axial direction of the molding surface 30. The compressing projections 33 are semi-circular and extend in the circumferential direction of the molding surface 30. Further, the compressing projections 33 have a smaller radius than that of the wire 13 (i.e., the radius of the sheath 24). The grooves 34 are semi-circular and extend in the circumferential direction of the molding surface 30. Further, the grooves 34 have substantially the same radius as the wire 13 (i.e., the radius of the sheath 24). As shown in FIG. 5, the axial cross-section of the molding surface 30 includes ridges and valleys formed by the alternate arrangement of the compressing projections 33 and the grooves 34 in the axial direction of the molding surface 30. Each compressing projection 33 forms a small-diameter portion in the molding surface 30, and each groove 34 forms a large-diameter portion in the molding surface 30.

Figure 9:
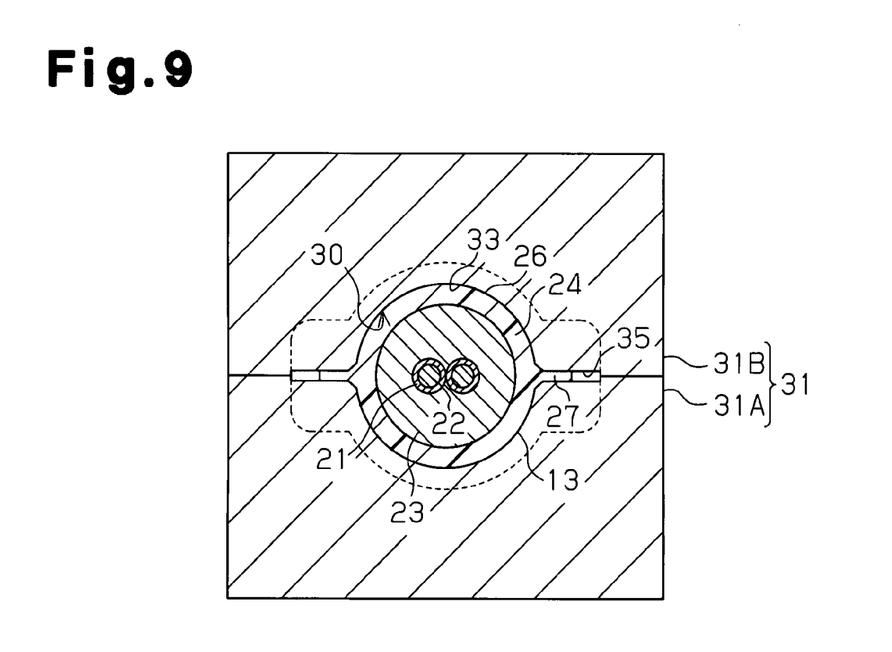
FIG. 9 is a cross-sectional view showing the state of the wire when compressed by the mold.
Figure 10:
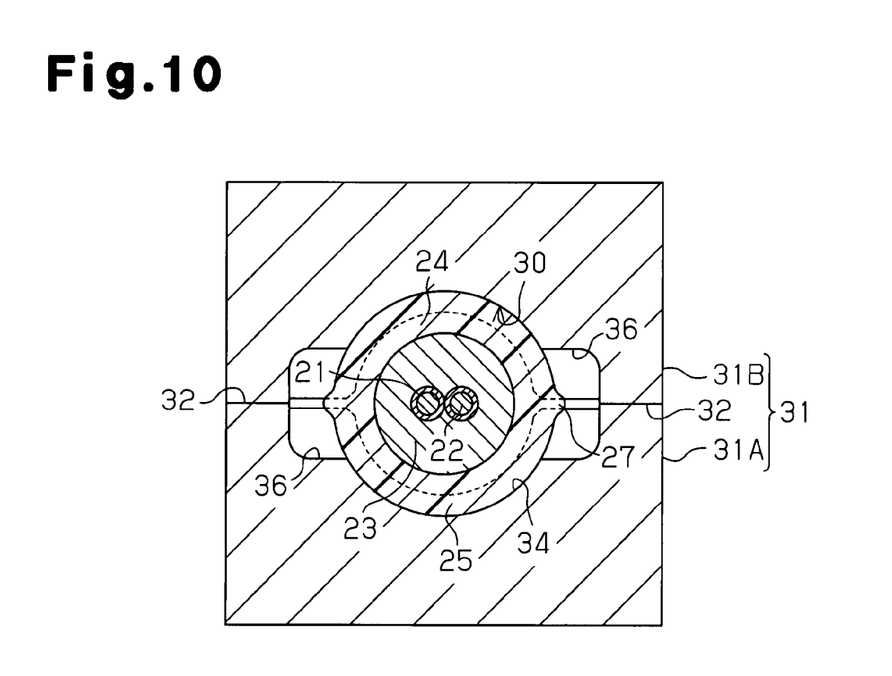
FIG. 10 is a cross-sectional view showing the state of the wire when compressed by the mold.

When forming the sealing structure on the wire 13, as shown in FIGS. 9 and 10, the mating surfaces 32 of the mold members 31A and 31B are abut against each other in a state in which the wire 13 is held between the molding surfaces 30 of the mold members 31A and 31B. The portion of the wire 13 held between the mold members 31A and 31B is heated. The compressing projections 33 having a smaller radius than that of the sheath 24 compress and deform the sheath 24 inwardly in the radial direction to form the grooves 26 extending in the circumferential direction on the sheath 24 (see FIG. 9). The portions of the sheath 24 corresponding to the grooves 34 remain intact without being compressed. This forms the sealing projections 25 extending in the circumferential direction (see FIG. 10).

Figure 7:
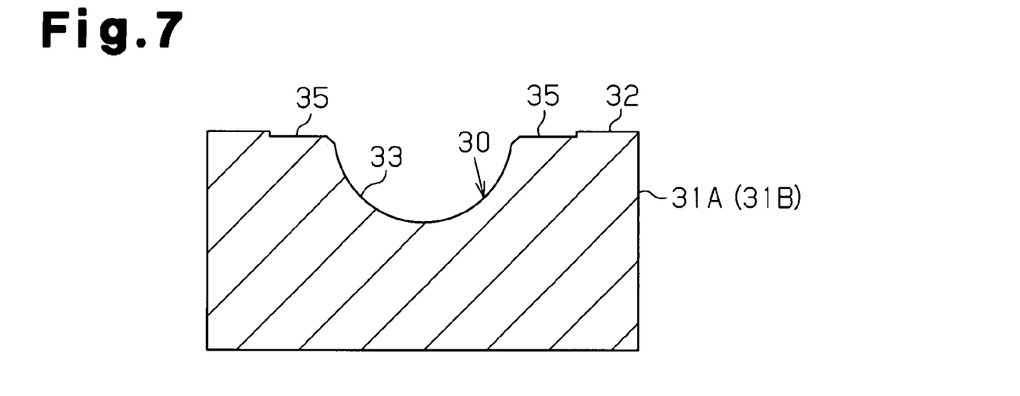
FIG. 7 is a cross-sectional view taken along line 7-7 in FIG. 6.

As shown in FIGS. 5 and 7, the mating surfaces 32 of the mold members 31A and 31B each have recesses 35, which are continuous with the two ends of the molding surface 30 in the circumferential direction. As shown in FIG. 9, when the mating surfaces 32 of the mold members 31A and 31B are abut against each other, the recesses 35 form a clearance that is continuous with the molding space defined by the molding surfaces 30. During the thermal compression of the wire 13 with the mold 31, the sheath 24 is partially pushed out into the clearance as excess material when compressed by the compressing projections 33. This forms the thin walls 27 in the clearance (see FIG. 9). Thus, excess material does not enter the space between the mating surfaces 32, and burrs are not formed. The surfaces defining the recesses 35 function as surfaces for forming the thin walls 27.

The two ends of each compressing projection 33 in the circumferential direction are chamfered. Specifically, the corners formed by the two circumferential ends of the compressing projection 33 and the surfaces defining the recesses 35 are chamfered. The chamfered portions enable the thickness of the thin walls 27 to increase toward the basal portions of the thin walls 27.

Figure 8:
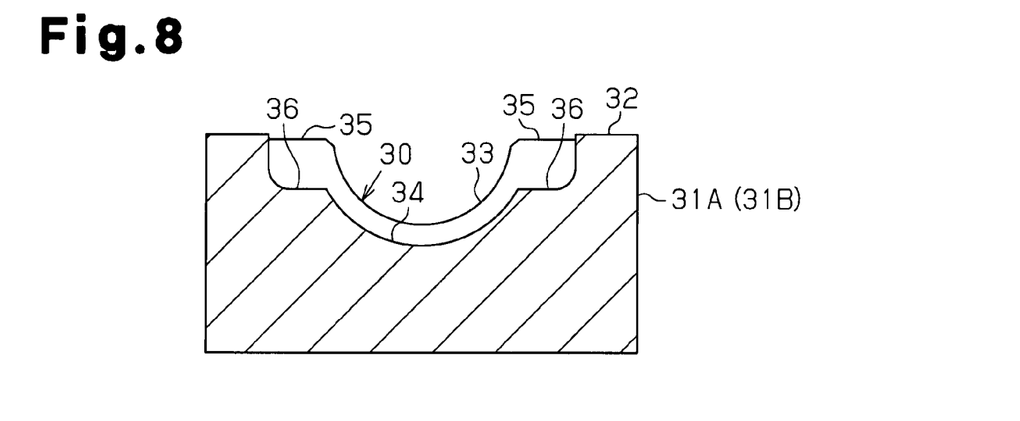
FIG. 8 is a cross-sectional view taken along line 8-8 in FIG. 6.

As shown in FIGS. 5 and 8, the mold members 31A and 31B each have relief pits 36 that are continuous with the two circumferential ends of the grooves 34. The relief pits 36 have the same width as the grooves 34 and are continuous with the recesses 35. The dimension of the relief pit 36 in the lateral direction of FIG. 8 corresponds to that of the recess 35. During the thermal compression of the wire 13 with the mold 31, the relief pits 36 allow the portions of the sealing projections 25 intersecting the thin walls 27 to smoothly rise to the same height as the thin walls 27.

The present embodiment has the advantages described below.

(1) The sheath 24 of the wire 13 is made of a resin material that is compatible with the resin material of the housing 14. The sheath 24 includes the sealing projections 25 extending entirely along the entire circumference of the sheath 24. The sealing projections 25 increase the surface area of the sheath 24. When molten resin material is poured into the housing formation mold for the housing 14, the heat of the molten resin material is efficiently transferred to the sealing projections 25. Therefore, even if the temperature of the molten resin material is relatively low, the sealing projections 25 are effectively melted or softened. This ensures the fusing of the housing 14 with the sealing projections 25. Accordingly, the interface between the housing 14 and the wire 13 is sealed even if a resin material injection gate of the housing formation mold is separated by a long distance from the wire 13 arranged in the mold. The sealing projections 25 extend along the entire circumference of the sheath 24. This further ensures the sealing of the interface between the housing 14 and the wire 13. Further, the structure for improving the sealing performance is provided on the wire 13 itself. Thus, the structure does not affect the shape of the housing 14. As a result, the shape of the housing 14 may be determined without being affected by the sealing structure of the wire 13. This easily reduces the size of the housing 14 and enables the housing 14 to be shaped in accordance with the location where the rotation sensor 11 is installed.

(2) A plurality of (two in this embodiment) sealing projections 25 are provided. This further improves the sealing in comparison with when there is only one sealing projection 25.

(3) The housing 14 and the sheath 24 are formed of resin materials that are compatible with each other so that they can be fused with each other. This enables the step of molding the housing 14 and the step of sealing the interface between the housing 14 and the wire 13 to be performed in a single step.

(4) The sheath 24 is provided with the thin walls 27 intersecting the sealing projections 25 so that the sealing projections 25 and the thin walls 27 support one another. This prevents the ridges and valleys of the sealing structure of the sheath 24 from being substantially eliminated since the sealing projections 25 and the thin walls 27 do not collapse during the molding of the housing 14. This ensures that the sealing projections 25 are melted during the molding of the housing 14 and ensures that the housing 14 and the sealing projections 25 are fused with each other.

(5) The circumferential portions of the sealing projections 25 corresponding to the thin walls 27 have the same height as the thin walls 27 in the radial direction of the wire 13. Therefore, the sealing projections 25 and the thin walls 27 support one another in an optimal manner and ensure that they do not collapse.

(6) When thermally compressing the sheath 24 with the mold 31, the sheath 24 is partially pushed out into the clearance formed by the recesses 35 as excess material produced by the compression with the compressing projection 33. This forms the thin walls 27 in the clearance. Thus, excess material is prevented from entering the space between the mating surfaces 32, and burrs are not formed. Burrs would interfere with the fusing of the housing 14 and the sealing projections 25 during the molding of the housing 14. The prevention of burr formation fuses the housing 14 and the sealing projections 25 in an optimal manner.

(7) The thin walls 27 project further outward from the sheath 24 in the radial direction of the wire 13. Accordingly, the excess material produced by the thermal compression of the sheath 24 is effectively used to form the thin walls 27 without forming burrs.

(8) The thickness of the thin walls 27 is increased toward the radially inner side of the wire 13, that is, the basal portion of the thin walls 27. This further ensures that the thin walls 27 do not collapse.

(9) The relief pits 36 formed in each of the mold members 31A and 31B allow the sealing projections 25 to smoothly rise to the same height as the thin walls 27 and connect to the thin walls 27 when the wire 13 is thermally compressed.

The above embodiment above may be modified as described below.

Although two sealing projections 25 are provided in the above embodiment, there may be any number of the sealing projections 25, for example, one or three or more.

Although two thin walls 27 are provided in the above embodiment, there may be any number of the thin walls 27, for example, one or three or more. The thin walls 27 may be omitted.

Although the two ends of the compressing projections 33 in the circumferential direction are chamfered in the above embodiment, the chamfering does not have to be performed.

The circumferential portions of the sealing projections 25 corresponding to the thin walls 27 do not have to be the same height as the thin walls 27.

The mold 31 may be divided into three or more mold members.

The thin walls 27 do not have to extend parallel to the axial direction of the wire 13 as long as they intersect the sealing projections 25.

The mold members 31A and 31B do not have to be provided with the relief pits 36.

The material for the sheath 24 may be a resin composition primarily composed of a thermoplastic polyester elastomer. Thermoplastic polyester elastomer refers to a block copolymer having a crystalline hard segment such as poly(butylene terephthalate) and an amorphous soft segment composed of a polyoxymethylene glycol such as polytetramethylene ether glycol, or an amorphous soft segment composed of a polyester glycol such as polycaprolactone glycol.

The mold 31 may be incorporated in a device for removing the sheath 24 to expose the conductive lines 22 at the end of the wire 13. In this manner, the step of exposing the conductive line 22 and the step of forming the sealing structure may be performed in a single step.

Although the wire 13 in the embodiment is a round wire, the wire may be a polygonal wire having a polygonal cross-sectional shape.

The present invention is not limited to the rotation sensor 11 for detecting the rotational speed of a wheel and may be embodied in other types of detectors including, for example, a rotation sensor for detecting the rotational speed of a power transmission shaft of a vehicle.

The invention claimed is:

1. A wire comprising:
   a conductive line, connected to a sensor portion accommodated in a housing, for transmitting an electrical signal from the sensor portion;
   a sheath covering the conductive line, the sheath being formed of a resin compatible with a material forming the housing; and
   a sealing projection arranged on a portion of the sheath that contacts the housing during molding of the housing so as to extend over the entire circumference of the sheath in the circumferential direction,
   wherein the sheath includes an intersecting wall intersecting the sealing projection.

2. The wire according to claim 1, wherein the sealing projection is arranged in a plurality in the axial direction of the wire.

3. The wire according to claim 1, wherein the sheath includes annular grooves spaced by a predetermined interval in the axial direction of the wire, the sealing projection is formed by a portion of the sheath between two adjacent grooves, and the grooves are formed by compressively deforming the sheath inward in the radial direction.

4. The wire according to claim 1, wherein the sealing projection includes a circumferential portion corresponding to the intersecting wall and having a height that is the same as the intersecting wall in the radial direction of the wire.

5. The wire according to claim 1, wherein the intersecting wall projects further outward in the radial direction of the wire than the sheath.

6. The wire according to claim 1, wherein the intersecting wall has a thickness that increases inward in the radial direction of the wire.

7. The wire according to claim 1, wherein the intersecting wall extends orthogonally to the sealing projection.

8. The wire according to claim 1, wherein the intersecting wall comprises a plurality of intersecting walls.

9. The wire according to claim 1, wherein the sheath includes portions around the sealing projection and the intersecting wall that are compressively deformed inward in the radial direction by a mold, and portions of the sheath surrounded by the compressively deformed portions form the sealing projection and the intersecting wall.

10. The wire according to claim 9, wherein excess material obtained when compressively deforming the sheath forms the intersecting wall.

11. A detector comprising a sensor portion, a wire having an end connected to the sensor portion to transmit an electric signal output by the sensor portion, and a housing formed from resin and covering the sensor portion and the end of the wire, the wire including a sheath formed of a resin compatible with the resin forming the housing, with the sheath having a portion covered by the housing and fused with the housing, and the wire includes a sealing projection arranged on a portion of the sheath contacting the housing during molding of the housing so as to extend over the entire circumference of the sheath in the circumferential direction, the sheath including an intersecting wall intersecting the sealing projection.

* * * * *